United States Patent
Lev et al.

(10) Patent No.: US 10,119,036 B2
(45) Date of Patent: Nov. 6, 2018

(54) PROCESS FOR THE FORMATION OF METAL OXIDE NANOPARTICLES COATING OF A SOLID SUBSTRATE

(75) Inventors: Ovadia Lev, Jerusalem (IL); Sergey Sladkevich, Rehovot (IL); Petr Prikhodchenko, Jerusalem (IL); Genia Gun, Jerusalem (IL)

(73) Assignees: YISSUM RESEARCH DEVELOPMENT COMPANY OF THE HEBREW UNIVERSITY OF JERUSALEM, LTD., Jerusalem (IL); NANYANG TECHNOLOGICAL UNIVERSITY, Singapore (SG)

( * ) Notice: Subject to any disclaimer, the term of this patent is extended or adjusted under 35 U.S.C. 154(b) by 1100 days.

(21) Appl. No.: 13/821,279

(22) PCT Filed: Sep. 7, 2011

(86) PCT No.: PCT/IL2011/000718
§ 371 (c)(1),
(2), (4) Date: Nov. 4, 2013

(87) PCT Pub. No.: WO2012/032518
PCT Pub. Date: Mar. 15, 2012

(65) Prior Publication Data
US 2014/0044922 A1     Feb. 13, 2014

Related U.S. Application Data

(60) Provisional application No. 61/380,597, filed on Sep. 7, 2010.

(51) Int. Cl.
B05D 3/02     (2006.01)
C09D 5/24     (2006.01)
(Continued)

(52) U.S. Cl.
CPC ............. C09D 5/24 (2013.01); B01J 23/14 (2013.01); B01J 23/18 (2013.01); B01J 27/0576 (2013.01);
(Continued)

(58) Field of Classification Search
CPC ........................................... C09D 5/24
See application file for complete search history.

(56) References Cited

U.S. PATENT DOCUMENTS

| | | |
|---|---|---|
| 6,344,277 B1 | 2/2002 | Ogata et al. |
| 2005/0234178 A1 | 10/2005 | Andrews |

(Continued)

FOREIGN PATENT DOCUMENTS

| | | | | |
|---|---|---|---|---|
| JP | 2003-026422 | | 1/2003 | |
| JP | 2003026422 | * | 1/2003 | ............. B01J 13/00 |

(Continued)

OTHER PUBLICATIONS

Martinez, Porous Tin Oxide Nanostructured Microspheres for Sensor Applications, Langmuir 2005, 21, p. 7937-7944.*

(Continued)

*Primary Examiner* — Tabatha L Penny
(74) *Attorney, Agent, or Firm* — Nixon & Vanderhye P.C.

(57) ABSTRACT

The present invention provides a process for the formation of a coating comprising peroxynanoparticles of metals selected from the group consisting of: Ga, Ge, As, Se, In, Sn, Sb, Te, Tl, Pb and Bi on a solid substrate, comprising providing a basic solution containing at least a first metal selected from said group and hydrogen peroxide, and contacting said solution with a solid substrate having oxygen-containing chemically reactive groups on its surface.

12 Claims, 11 Drawing Sheets

(51) Int. Cl.
| | |
|---|---|
| *B01J 23/14* | (2006.01) |
| *B01J 23/18* | (2006.01) |
| *B01J 27/057* | (2006.01) |
| *B01J 35/00* | (2006.01) |
| *B01J 37/02* | (2006.01) |
| *B05D 1/00* | (2006.01) |
| *B82Y 30/00* | (2011.01) |
| *C01B 15/04* | (2006.01) |
| *C01B 15/047* | (2006.01) |
| *C04B 41/00* | (2006.01) |
| *C23C 18/00* | (2006.01) |
| *C23C 18/12* | (2006.01) |
| *C01B 32/00* | (2017.01) |
| *B01J 21/08* | (2006.01) |
| *B01J 21/16* | (2006.01) |

(52) U.S. Cl.
CPC ....... *B01J 35/0013* (2013.01); *B01J 37/0215* (2013.01); *B05D 1/00* (2013.01); *B82Y 30/00* (2013.01); *C01B 15/04* (2013.01); *C01B 15/047* (2013.01); *C01B 32/00* (2017.08); *C04B 41/00* (2013.01); *C23C 18/00* (2013.01); *C23C 18/1216* (2013.01); *C23C 18/1295* (2013.01); *B01J 21/08* (2013.01); *B01J 21/16* (2013.01); *Y10T 428/24413* (2015.01)

(56) References Cited

U.S. PATENT DOCUMENTS

| | | | |
|---|---|---|---|
| 2008/0035025 A1* | 2/2008 | Andrews | C01B 15/04 106/400 |
| 2010/0239774 A1* | 9/2010 | Andrews | C01B 15/04 427/397.7 |
| 2010/0239862 A1* | 9/2010 | Andrews | C01B 15/04 428/402 |

FOREIGN PATENT DOCUMENTS

| | | | | |
|---|---|---|---|---|
| JP | 2003026422 A | * | 1/2003 | |
| JP | 2008-081378 | | 4/2008 | |
| JP | 2008081378 | * | 4/2008 | ............. B01J 13/00 |
| WO | WO 2011/019764 | | 2/2011 | |

OTHER PUBLICATIONS

Lou, Template-Free Snthesis of SnO2 Hollow Nanostructures with High Lithium Storage Capacity, Adv. Mater. 2006, 18, p. 2325-2329.*

Sladkevich, Hydrogen peroxide induced formation of peroxystannate nanoaprticles, J Sol-Gel Sci Technol, (2009) 50:229-240.*
International Search Report for PCT/IL2011/000718, dated Apr. 12, 2012.
Written Opinion for PCT/IL2011/000718, dated Apr. 12, 2012.
Sladkevich et al., "Hydrogen peroxide induced of peroxystannate nanoparticles", *Journal of Sol-Gel Science and Technology*, vol. 50, No. 2, Jul. 30, 2008, pp. 229-240.
Hu et al., "Controlled coating of antimony-doped tin oxide nanoparticles on kaolinite particles," *Applied Clay Science*, 2010, vol. 48, pp. 368-374.
Juttukonda et al., "Facile Synthesis of Tin Oxide Nanoparticles Stabilized by Dendritic Polymers," *Journal of the American Chemical Society*, 2006, vol. 128, No. 2, pp. 420-421.
Lou et al., "Template-Free Synthesis of SnO2 Hollow Nanostructures with High Lithium Storage Capacity," *Advanced Materials*, 2006, vol. 18, pp. 2325-2329.
Müller et al., "Transparent Conducting Films of Antimony-Doped Tin Oxide with Uniform Mesostructure Assembled from Preformed Nanocrystals," *Small*, 2010, vol. 6, No. 5, pp. 633-637.
Nütz et al., "Wet-Chemical Synthesis of Doped Nanoparticles: Optical Properties of Oxygen-Deficient and Antimony-Doped Colloidal SnO2," *The Journal of Physical Chemistry B*, 2000, vol. 104, No. 35, pp. 8430-8437.
Santilli et al., "Dynamical scaling properties of nanoporous undoped and Sb-doped $SnO_2$ supported thin films during tri- and bidimensional structure coarsening," *Physical Review B*, 2007, vol. 75, pp. 205335-1-205335-8.
Tolstoy, "The peroxide route of the successive ionic layer deposition procedure for synthesizing nanolayers of metal oxides, hydroxides and peroxides," *Thin Solid Films*, 1997, vol. 307, pp. 10-13.
Urade et al., "Synthesis of Thermally Stable Highly Ordered Nanoporous Tin Oxide Thin Films with a 3D Face-Centered Orthorhombic Nanostructure," *The Journal of Physical Chemistry B*, 2005, vol. 109 No. 21, pp. 10538-10541.
Dey et al., "Water Soluble $Na[Nb(O_2)_3] \cdot 2H_2O$ as a New Molecular Precursor for Synthesis of Sodium Niobate," *Journal of the Ceramic Society Japan*, vol. 115, No. 12: 808-812 2007.
Medvedev et al., "Potassium, Cesium, and Ammonium Peroxogermanates with Inorganic Hexanuclear Peroxo Bridged Germanium Anion Isolated from Aqueous Solution," *Inorganic Chemistry*, vol. 54: 8058-8065 (2015).
Schumb et al., *Hydrogen Peroxide*, American Chemical Society Monograph Series, New York, NY, pp. 525 (1955).
Wu et al., "Thermal hazard analyses and incompatible reaction evaluation of hydrogen peroxide by DSC" *J. Therm. Anal. Calorim.*, vol. 102: pp. 563-568 (2010).

* cited by examiner

PROCESS FOR THE FORMATION OF METAL OXIDE NANOPARTICLES COATING OF A SOLID SUBSTRATE

This application is the U.S. national phase of International Application No. PCT/IL2011/000718 filed 7 Sep. 2011 which designated the U.S. and claims priority to U.S. Prov. Application No. 61/380,597 filed 7 Sep. 2010, the entire contents of each of which are hereby incorporated by reference.

BACKGROUND OF THE INVENTION

Transparent and conductive metal oxides and doped metal oxides coatings, and specifically tin oxide coatings, are receiving considerable scientific attention for use in solar cells, sensors, smart (heated) windows and touch panel displays, voltage dependent resistors and LED devices, and catalysts.

Diverse methods for particle and nanoparticle metal oxide formation and surface coatings are known in the art. Classification of the wet (doped as well as undoped) tin oxide coating methods reveals that they are mostly produced in acidic media, usually from chloro or alkoxy precursors (followed by an annealing step) [see, for example, Santilli, C. V. et al (*Phys. Review B* 2007, 75, 205335), Hu, P. W. et al (*Appl. Clay Sci.* 2010, 48, 368) and Nutz, T. et al (*J. Phys. Chem. B* 2000, 104, 8430)], made by electroless deposition (e.g. with silver seeding), or are made of preformed, stabilized nanocrystalline dispersions [see Muller, V. et al (*Small* 2010, 6, 633)]. Much of the antimony tin oxide synthesis efforts are directed towards finding appropriate organic ligands that will control the hydrolysis and condensation rates of the dopant and tin precursors in order to allow intimate contact of the antimony and tin oxides already at the (nanoparticle) dispersion state.

The preparation of tin oxide nanoparticles and hollow spheres from hydroxostannate were described, for example, by Juttukonda, V. et al (*J. Am. Chem. Soc.* 2006, 128, 420), Urade, V. N. et al (*J. Phys. Chem. B* 2005, 109, 10538) and Lou, X. W. et al (*Adv. Mater.* 2006, 18, 2325). Sladkevich, S. et al (*J. Sol Gel Sci. Technol.* 2009, 50, 229-240) describe the formation of peroxystannate nanoparticles by hydrogen peroxide induced polymerization in water-potassium hexahydroxystannate solutions but did not mention film formation from such solutions. Tolstoy, V. P. (*Thin Solid Films* 1997, 307, 10-13; Zh Neorg. Khim. 7 (1993) 1146-1148) described a process for synthesizing tin oxide coatings by consecutive oxidation and hydrolysis of tin(II) fluoride by hydrogen peroxide under near-neutral or acidic conditions.

SUMMARY OF THE INVENTION

The present invention is primarily directed to a process for the formation of a coating composed of peroxynanoparticles of metals selected from the group consisting of: Ga, Ge, As, Se, In, Sn, Sb, Te, Tl, Pb and Bi on a solid substrate, wherein said process comprises providing a basic solution containing at least a first metal selected from said group and hydrogen peroxide, and contacting said solution with a solid substrate having oxygen-containing chemically reactive groups on its surface.

It is to be noted that the term 'metal' as used herein indicates each of the elements present in rows 4-6 of columns 13-16 of the periodic table, despite the fact that some of these elements are sometimes known in the art as 'metalloids'.

The terms "peroxyparticles", "peroxynanoparticles", "peroxystannate" and the like, refer to entities in which the peroxo or hydroperoxo ligands are covalently attached to the metal rather than conjugation to the network by hydrogen bond or London van der Waals forces.

Preferably, the at least one metal is present in the aforementioned basic solution in its highest oxidation state, prior to the addition of hydrogen peroxide.

In a preferred embodiment, the metal-containing solution used in the process according to the present invention comprises one or more of the following metals: tin, antimony, germanium and tellurium. In one preferred embodiment, the metal-containing solution comprises tin in its highest oxidation state (+4). In a particularly preferred embodiment, the metal solution may comprise both tin and antimony. Preferably, the ratio between the tin and the antimony in this embodiment is in the range of 1 to 25.

Whilst the aforementioned basic solution may be prepared using a variety of different bases, in one preferred embodiment said solution comprises a nitrogen-containing base, e.g. ammonium hydroxide or tetra-alkyl ammonium hydroxide. The pH of the basic solution is preferably higher than 8.5, more preferably higher than 9.

In some cases, the step of contacting the metal-containing solution with the solid substrate is performed in the presence of an antisolvent capable of inducing the precipitation of the metal-containing coating. Suitable antisolvents include (but are not limited to) alcohol, acetonitrile, ethylacetate, ethers or mixtures thereof.

As mentioned hereinabove, the substrate used in the process of the present invention contains oxygen-containing chemically reactive groups on its surface. Suitable groups include —OH, —OOH, oxo(=O), M-O-M wherein M indicates the substrate, carbonate and oxygenated SP2 carbon.

In order to convert the peroxynanoparticles into the corresponding metal oxides or mixed metal oxides, the coated substrate is heat treated under suitable conditions, to form crystalline oxide coatings. It should be noted that it is possible to use substrates that are destroyed by the heat treatment or chemical dissolution in order to obtain a structure consisting of mixed metal oxide and binary or tertiary crystalline nanostructures that are essentially devoid of substrate material.

Thus, the process according to the present invention may further comprise removing the substrate by means of a heat treatment or dissolution step to obtain a structure consisting of sheets made of peroxynanoparticles or metal oxide nanoparticles that are essentially devoid of substrate material.

Examples of suitable substrates that may be used for the presently-disclosed process include (but are not limited to) clays, sol-gel materials, and lithium niobate and calcite.

The concentration of the hydrogen peroxide between 1% and 50% weight percent.

The nanoparticles formed on the substrate during the process of the present invention generally have a diameter of less than 10 nm. It should be noted, however, that following heat treatment particles having a larger diameter may be formed, for example particles larger than 20 nm.

In another aspect, the present invention provides a solid substrate coated with peroxynanoparticles of at least one metal selected from the group consisting of: Ga, Ge, As, Se, In, Sn, Sb, Te, Tl, Pb and Si. Preferred substrates include graphene oxide and materials containing SP2 carbon with oxygenated groups.

In a preferred embodiment of this aspect of the invention, the coating is made of peroxynanoparticles of the following metals: tin, antimony, germanium and tellurium.

Preferably the peroxynanoparticles present in the coating have a diameter of less than 10 nm.

DETAILED DESCRIPTION

The present invention permits the formation of a metal peroxide/oxide discrete nanoparticle coating on a solid substrate by its immersion in a basic, organic ligand free, stable solution comprising metal peroxyparticles and oligomers suspended in hydrogen peroxide rich aqueous solutions or by conventional dip coating, spray coating, spin coating or spread coating of the substrates by the said peroxyparticle suspensions. The nanoparticle coating formation takes place exclusively on the solid substrate surface and practically no agglomeration occurs in the solution, as is evident by electron microscopy studies.

According to the process of the invention, a soluble form of a suitable metal (also designated herein "metal precursor") is dissolved in a basic hydrogen peroxide solution, allowing the formation of metal peroxycomplexes [of the form $[Me(OH)_{n-x}(OOH)_x]^{m-n}$, and their deprotonated forms and their oligomers wherein m denotes the oxidation state of the metal and n denotes the number of hydroperoxo and hydroxo ligands substituted on the metal, x is a real number larger than 0 but smaller or equal to n]. The subsequent immersion of a solid substrate having chemically reactive groups (e.g. MOH, MOOH, M=O, M-O-M or carbonate) present on its surface, followed by subjection of the solution to conditions allowing the formation of a nanoparticle coating layer (e.g., by the addition of an antisolvent), allows the preferential attachment of hydroperoxo metal oligomers to the substrate. In one embodiment the reactive substrate can be graphene oxide or another partially oxygenated SP2 carbon surfaces.

The present invention is therefore primarily directed to a process for the formation of a discrete peroxynanoparticle coating on a solid substrate, comprising providing a solution of a metal salt, hydrogen peroxide and a base, and contacting said solution with a solid substrate having chemically reactive groups present on its surface (e.g., hydroxyl groups) under conditions allowing the formation of a peroxynanoparticle coating (e.g., by the addition of an antisolvent). Optionally, the coated substrate thus obtained is subsequently subjected to heat treatment to yield the corresponding crystalline metal oxide nanoparticle coated substrate. Optionally two or more precursor salts are used to produce mixed metal peroxyparticles which can be subsequently converted to mixed metal oxides or to doped metal oxide, such as antimony doped metal oxide.

In an embodiment of the invention, more than one coating layers are formed on the substrate by carrying out the process of the invention consecutively.

A metal precursor, which is suitable for use as a starting material according to the process of the invention, is any water-soluble salt of a non-transition metal, post transition metal or metalloid (corresponding to columns 13-16 of the periodic table and rows 4 to 6. Optionally, a mixture of more than one metal salts may be used as the metal precursor. In an embodiment of the invention, the metal precursor is a stannate salt, such as a hydroxostannate salt (e.g. tetramethyl ammonium hexahydroxostannate). The metal precursor can also be in the form of a metal salt (e.g. $SnCl_4$) provided that the excess base is then used to elevate the pH sufficiently to form the metal hydroperoxospecies. In a preferred embodiment, a mixture of hydroxostannate and hydroxoantimonate is used as the metal precursor.

The metal precursor is dissolved in an aqueous hydrogen peroxide solution. The weight concentration of hydrogen peroxide in the solution is above 1%, preferably above 10%, with a hydrogen peroxide weight concentration of over 12% being especially preferred.

In an embodiment of the invention, the molar concentration of the metal precursor in the hydrogen peroxide solution is in the range of 0.01-1 M. In a preferred embodiment, the molar concentration of the precursor in the solution is in the range of 0.05-0.5 M.

The obtained solution, comprising the metal precursor and hydrogen peroxide, allows the formation of peroxometal oligomers. Without being bound to theory, it is suggested that the hydroperoxo ligand acts as a capping agent that prevents full condensation and precipitation of the peroxymetal oligomers in the solution. The oligomers, upon contact with a suitable solid substrate [under certain conditions, such as the addition of an antisolvent] create a discrete nanoparticulate coating layer by their attachment to the chemically reactive groups present on the substrate's surface. It is also likely that hydrogen bonding between the hydroperoxo moieties on the dispersed oligomers/nanparticles and on the surface promotes full surface coverage by the peroxynanoparticles.

The solid substrate for use in the process of the invention, having chemically reactive groups present on its surface, namely, hydroxyl groups, may be any substrate comprising an MOH group, wherein M denotes any element that does not catalyze hydrogen peroxide decomposition, on metal, semi-metal or metalloid oxides. Suitable oxides include, but are not limited to, $SiO_2$, $TiO_2$, $SnO_2$, $Sb_2O_3$, $Au_2O_3$, $Ag_2O$, PtO, ZnO, $ZrO_2$, $Al_2O_3$ and $AuO_x$. The metal oxides can be in the form of bulk metal oxides, or a thin film coating over a metal (e.g., a gold oxide coating on gold or other metals). The hydroxyl group may optionally be part of a surface carboxyl functionality, such as, for example, graphene oxide, oxidized surface of carbon nanotubes or oxidized surface of plastics (e.g. polyethylene). Carbonato ligands (as in calcium carbonate) or oxo groups can also form reactive surfaces. Oxygenated sites on predominantly SP2 carbon surfaces (e.g. graphene oxide) is another example of reactive surface.

Preferred solid substrates include sepiolite (magnesium silicate 1-D clay), muscovite (potassium mica), kaolin (2-D aluminosilicate), sol-gel silica powder, lithium niobate ($LiNbO_3$) and calcite ($CaCO_3$) and graphene oxide. Especially preferred are muscovite and graphene oxide.

The solid substrate coating procedure is carried out by allowing the substrate to contact the metal precursor and hydrogen peroxide solution under conditions allowing the formation of a peroxynanoparticle coating. The coating procedure may be carried out by methods known in the art, such as, for example, dip coating, spread coating or spray coating. In an embodiment of the invention, the solid substrate is immersed in the solution at a temperature and for a duration allowing the spontaneous formation of a nanoparticulate coating. In a preferred embodiment, the solid substrate is immersed in the solution and an antisolvent is added to yield the coating formation. Suitable antisolvents include water soluble organic solvents such as acetonitrile, alcohols, ethers and mixtures thereof. Preferably, ethanol is used as the antisolvent.

The metal peroxide coated substrate thus obtained may optionally subsequently subjected to heat treatment to yield the corresponding crystalline metal oxide discrete nanoparticle coated substrate. For example, the coated substrate may be calcined at a temperature of 300-1000° C. (e.g. 600° C.), depending on the required crystallinity and the heat stability of the substrate. Optimum temperature for antimony doped tin oxide coating on muscovite was 800° C. Furthermore the substrate can be burned out or dissolved leaving the standalone metal oxide. This is exemplified in example 6 (FIG. 6C) by the removal of graphene oxide substrate by heat treatment in air, thus leaving nanoparticle sheets of tin oxide.

The coating obtained by the process of the invention consists of discrete metal oxide/peroxide nanoparticles. The coating comprises a layer of less than 50 nm, preferably less than 20 nm, and more preferably less than 10 nm of nanocrystalline material, rendering it favorable for use in catalysis and optical applications.

Various aspects of the invention are further illustrated by the following examples, which are not to be construed as limiting.

In the figures:

FIGS. 4(1) and 4(2) illustrate XRD studies of calcined (at 800° C.) and room temperature prepared ATO-coated muscovite, respectively.

EXAMPLES

Materials

Tin (IV) chloride, antimony (V) chloride, Germanium chloride, telluric acid, tetramethyl ammonium hydroxide (25% aq. solution), hydrogen peroxide (30%) and calcite were purchased from Sigma-Aldrich (Rehovot, Israel).

Ammonium hydroxide and ethanol (abs.) were purchased from Biolab (Jerusalem, Israel).

$LiNbO_3$ was donated by Professor M. Rott from the Hebrew University.

Sepiolite was purchased from Sigma-Aldrich and kaolin was donated by Mobichem Ltd, Israel.

Sol-gel silica nanoparticles were prepared by a procedure described in reference Abarkan I.; Doussineau, T.; Smaihi, Polyhedron, 2006, 25, 1763-1770.

Muscovite mica (Mica-M) was purchased from Merck (Darmstadt, Germany) and was cleaned before use by reflux in 2.6M nitric acid and annealing at 600° C. for 2 hours. Other clay minerals were treated by the same procedure.

Graphene oxide was prepared in Preparation 5, hereinbelow.

Measurements

HR TEM imaging was performed at 200 kV using the FEI Technai F20 G2 (Eindhoven, Holland) High Resolution Transmission Electron Microscope (HR TEM). A drop of the suspension of the sample in ethanol was deposited onto 400 mesh copper grids covered with thin amorphous carbon films.

SEM imaging was performed using the FEI Sirion High Resolution Scanning Electron Microscope (HR SEM, Eindhoven, Holland). Accelerating voltage was set at 5-15 kV, working distance 5 mm, using Ultra-High resolution mode with Through-the-Lens Detector. The dried samples were either placed directly onto carbon conductive film, or immersed in ethanol, placed in an ultrasonic bath for 10 min, and the suspension was then dropped on a glass surface and dried out. Samples were coated by Au/Pd for conductivity.

The scanning transmission electron microscopy imaging was performed on Extra-High Resolution XHR SEM Magellan 400L, FEI company. The images were acquired on grids, (used for transmission electron microscopy) by using scanning-transmission (STEM) detector to obtain the TEM image. The acceleration voltages were 20-25 kV.

$^{119}$Sn NMR spectra were collected on a Bruker Avance-500 (11.7T) spectrometer at resonance frequency 186.4 MHz. The measurements were performed using a single pulse sequence with rf pulse duration of 10 μs and recycling time 30 s.

XPS measurements were performed on a Kratos Axis Ultra X-ray photoelectron spectrometer (Manchester, UK). High resolution spectra were acquired with monochromated Mg Kα (1253.6 eV) X-ray source with 0° takeoff angle. The pressure in the test chamber was maintained at $1.7 \cdot 10^{-9}$ Torr during the acquisition process. Data analysis was performed with Vision processing data reduction software (Kratos Analytical Ltd.) and CasaXPS (Casa Software Ltd.).

X-ray powder diffraction measurements were performed on a D8 Advance diffractometer (Bruker AXS, Karlsruhe, Germany) with a goniometer radius 217.5 mm, Göbel Mirror parallel-beam optics, 2° Sollers slits and 0.2 mm receiving slit. The powder samples were carefully filled into low background quartz sample holders. The specimen weight amounted to approximately 0.5 g. XRD patterns from 5° to 60° 2θ were recorded at room temperature using CuKα radiation (k=1.5418 Å) under the following measurement conditions: Tube voltage of 40 kV, tube current of 40 mA, step scan mode with a step size 0.02° 2θ and counting time of 1 s/step. XRD patterns were processed using Diffrac Plus software.

Resistivity of ATO coated mica samples. Triply coated mica powder was placed in a home-made hand press device, pressed by 2 $10^6$ Pa and then the conductivity was measured.

Preparation 1

Preparation of Hydroxostannate Solution 10 mL of $SnCl_4$ (0.086 mol) was dissolved in 5 mL of water and neutralized with ammonia until pH 7. The precipitate was washed several times with water and dissolved by mixing with 31 mL of 25% tetramethylammonium hydroxide (0.086 mol) under moderate heating (i.e., 30° C.) for about 30 minutes. After full dissolution, water was added to give a tin concentration of 1.4 M.

Preparation 2

Preparation of Hydroxoantimonate Solution 10 mL of $SbCl_3$ (0.078 mol) was dissolved in 5 mL of water and neutralized with ammonia until pH 7. The precipitate was washed several times with water and dissolved by mixing with 28.5 mL of 25% tetramethylammonium hydroxide (0.078 mol) under moderate heating (i.e., 60° C.) for about 4 hours. After full dissolution, water was added to give an antimony concentration of 1.4 M.

Preparation 3

Preparation of Hydroxogermanate Solution 10 ml of $GeCl_4$ (0.088 mol) was dissolved in 5 ml of water and neutralized with ammonia until pH 7. The precipitate was washed 5 times with water and dissolved in 31.6 ml of 25% tetramethylammonium hydroxide (0.088 mol) under moderate heating (i.e., 40° C.). After full dissolution, water was added to achieve 1.0M germanium concentration.

Preparation 4

Preparation of Hydroperoxotellurate Solution 0.6 g of telluric acid ($H_6TeO_6$, 0.00261 mol) was dissolved in 5 ml of deionized water, then 1 ml of 25% aqueous tetramethylammonium hydroxide solution (0.00279 mol) and 6 ml of 30% hydrogen peroxide solution were added.

Preparation 5

Graphene oxide was prepared by a modified Hummers method (See for ex. Zhang et al, J Phys Chem C, 113, 2009, 10842). 1 g of exfoliated carbon was added to a solution of 6.66 g of potassium peroxodisulfate and 6.66 g of phosphorus pentoxide in 32 ml sulfuric acid (98%). The mixture stirred at 80° C. during 4.5 h. After cooling, it was diluted with deionized water, filtered, washed on the filter with water. The clean material was dried for 2 h at 120° C. Preoxidized material was redispersed in $H_2SO_4$ (98%), then 5 g of potassium permanganate was added slowly to the mixture upon stirring and ice bath cooling. The temperature was adjusted to 35° C. and the mixture was stirred for 2 h, then 180 ml of deionized water was slowly added, and the dispersion left to stir for an additional 2 h. At last, 300 ml of deionized water and 8 ml of hydrogen peroxide (30%) were sequentially added, and a bright brown-yellow colored solution was produced. The oxidized graphene was filtered, washed with distilled water and with alcohol, dried in vacuum at 80° C. for 4 h.

Example 1

Preparation of ATO Coated Solid Substrates

A precursor solution was first prepared as follows. 1.9 mL of the hydroxostannate solution of Preparation 1 and 5 mL of the hydroxoantimonate solution of Preparation 2 were mixed together with 15 mL 30% hydrogen peroxide solution and 8 mL water. An excess of hydroxoantimonate is used due to its partial solubility in ethanol.

For the coating of the solid substrates, 600 mg of substrate was dispersed in 15 mL of the precursor solution by sonication. Following 10 minutes of stirring, precipitation of particles onto the substrate surface was accomplished by the addition of 120 mL of ethanol. The coated substrate was washed with ethanol, dried and calcined at 800° C. for 3 hours.

Six different solid substrates were coated by the procedure described above: sepiolite (magnesium silicate 1-D clay), muscovite (potassium mica), kaolin (2-D aluminosilicate), sol-gel silica powder, lithium niobate ($LiNbO_3$) and calcite.

Figure 1A:
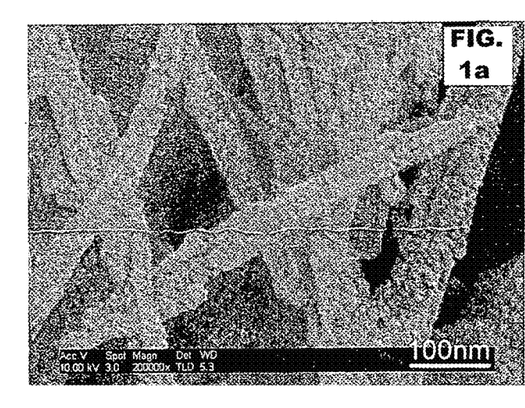
FIGS. 1a and 1b are SEM and TEM micrographs of ATO coated sepiolite, respectively.
Figure 1B:
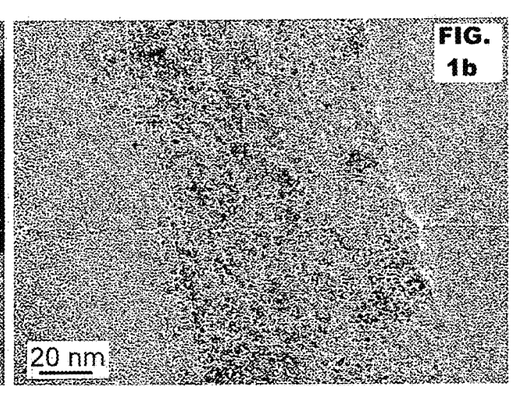
Figure 1C:
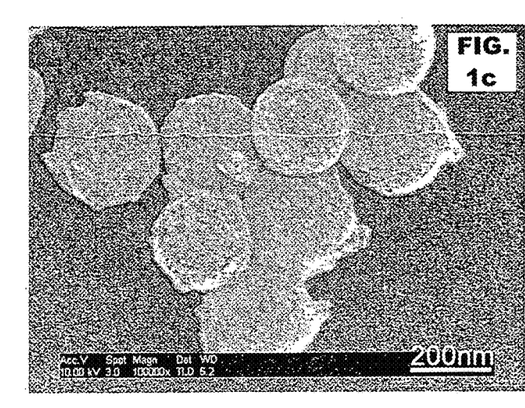
FIGS. 1c and 1d are SEM and TEM micrographs of ATO coated sol gel silica powder, respectively.
Figure 1D:
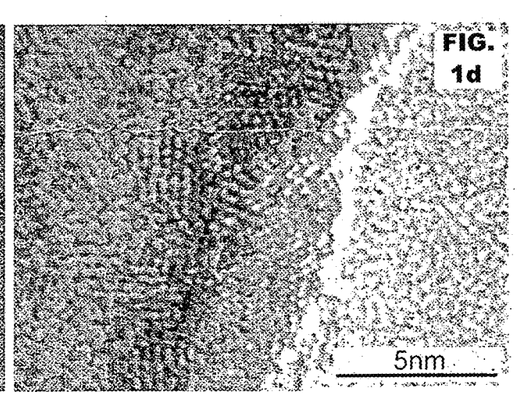
Figure 1E:
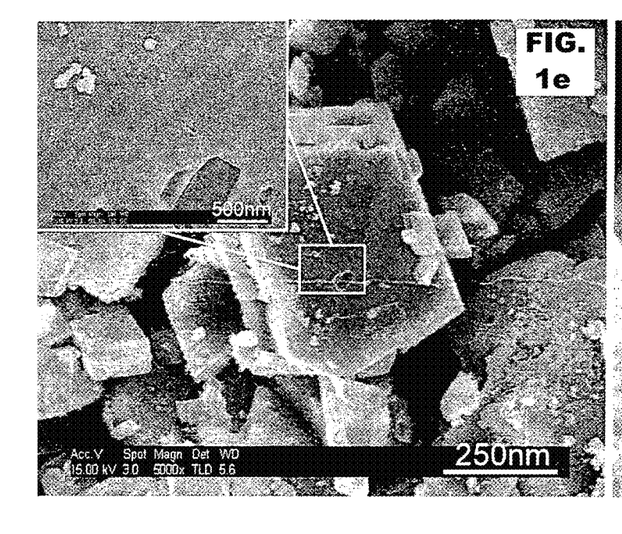
FIGS. 1e and 1f are SEM and TEM micrographs of ATO coated calcite, respectively.
Figure 1F:
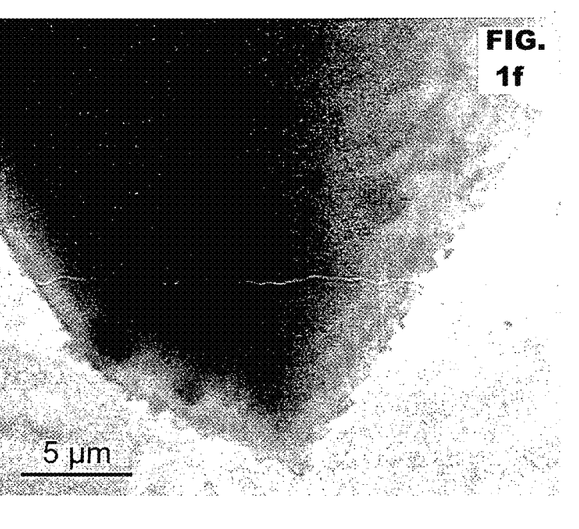
Figure 2A:
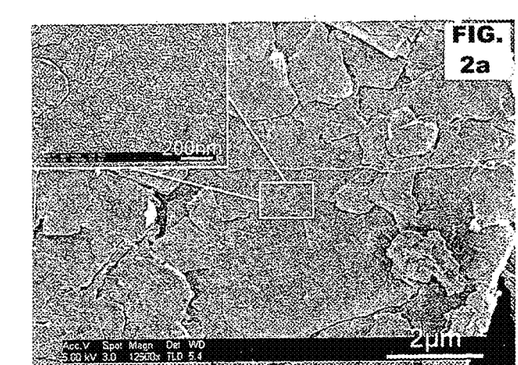
FIGS. 2a and 2b are SEM and TEM micrographs of ATO coated kaolin, respectively.
Figure 2B:
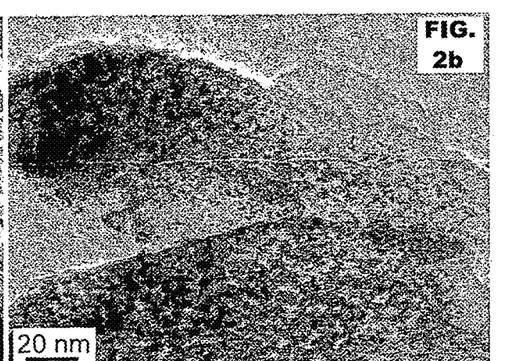
Figure 2C:
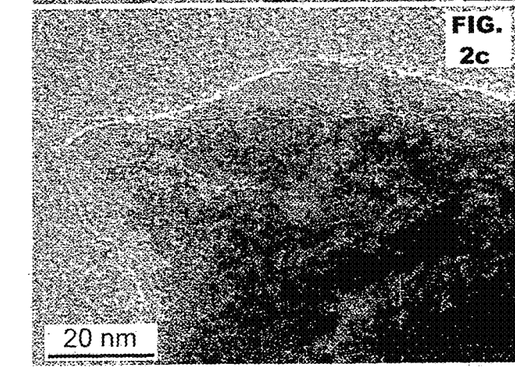
FIG. 2c is a TEM micrograph of ATO coated lithium niobate.
Figure 2D:
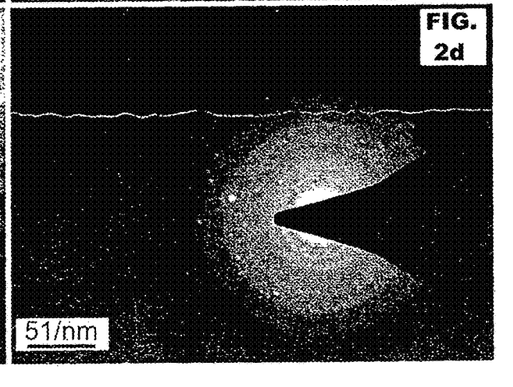
FIG. 2d depicts the electron diffraction pattern of ATO coated single crystal lithium niobate.
Figure 3A:
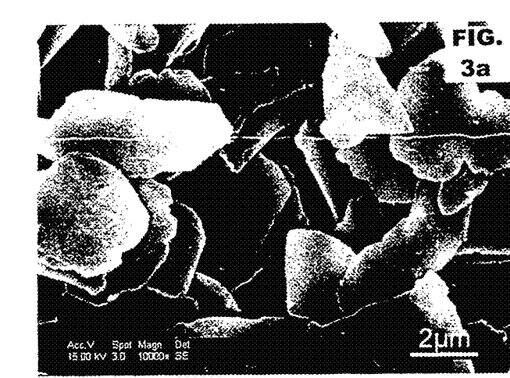
FIG. 3a is an SEM micrograph of uncoated muscovite.
Figure 3B:
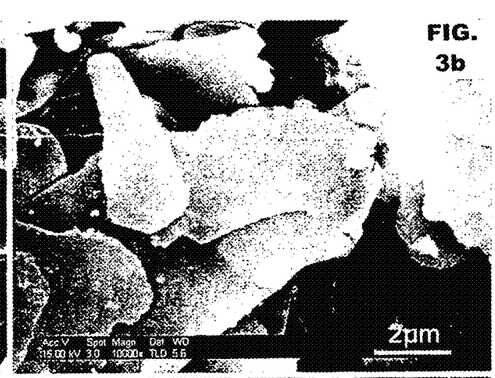
FIG. 3b is an SEM micrograph of muscovite coated by using a hydroperoxostannate and hydroperoxoantimonate precursor.
Figure 3C:
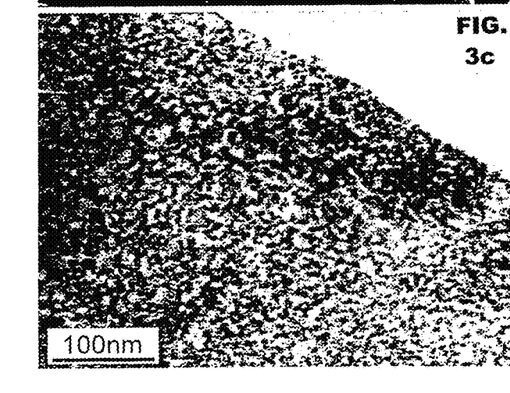
FIG. 3c is a TEM micrograph of ATO coated muscovite.

The SEM and TEM micrographs of coated and heat treated sepiolite, sol gel silica powder and calcite are depicted in FIGS. 1a and 1b, 1c and 1d, and 1e and 1f, respectively. The SEM and TEM micrographs of kaolin are presented in FIGS. 2a and 2b, respectively. The TEM micrograph of lithium niobate is presented in FIG. 2c, while FIG. 2d depicts the electron diffraction pattern of ATO coated single crystal lithium niobate. SEM micrographs of uncoated muscovite and ATO coated muscovite are depicted in FIGS. 3a and 3b, respectively. TEM micrograph of coated muscovite is presented in FIG. 3c.

The SEM micrographs of the coated and heat treated substrates (FIGS. 1a, 1c, 1e, 2a and 3b) show that the ATO is exclusively attached to the substrate and is not agglomerated elsewhere.

The TEM micrographs of the coated substrates (FIGS. 1b, 1d, 1f, 2b, 2c, and 3c), taken at the edge of the particles, show approximately 5 nm crystalline ATO particles almost uniform in size, for all exemplified coated substrates.

The active oxygen content of tin oxide coated muscovite before heat treatment to obtain the micrograph exhibited in FIG. 3b was determined by permanaganatometry to be 1.5%.

The single crystal diffraction dots of the lithium niobate and the multicrystalline diffraction rings of the ATO nanocrystals are apparent in FIG. 2d, illustrating the electron diffraction pattern of ATO coated single crystal lithium niobate. These crystalline rings are apparent in all other heat treated coated samples, though they are not shown here.

It may be appreciated that in the case of the two acid-sensitive substrates, namely, lithium niobate and calcite, the coating took place exclusively on the minerals and the size of the crystallite was again around 5 nm, despite the lack of external silica tetrahedera or surface silanols in these minerals.

XRD studies of calcined (at 800° C.) and room temperature prepared ATO-coated muscovite are depicted in FIGS. 4(1) and 4(2), respectively. The room temperature coated mica shows some broad shallow peaks at 2θ=50-55 and at 25-35 degrees corresponding to amorphous tin oxide. Heat treatment resulted in formation of a tin-oxide phase as observed by the crystalline x-ray diffraction. The crystalline size by Scherrer equation is 9 nm, which is somewhat larger compared to the uniform 5 nm size obtained in the TEM studies.

Figure 5A:
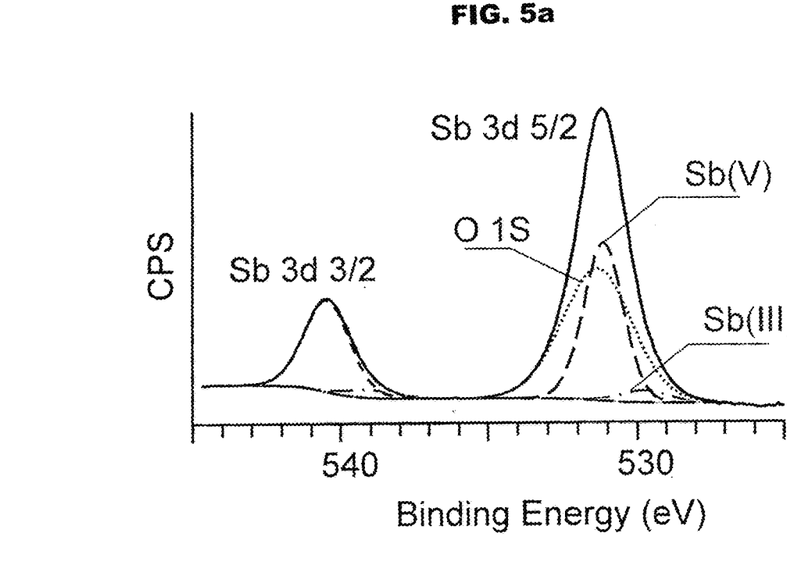
FIG. 5(a) illustrates XPS studies of 800° C. treated ATO coated muscovite. The two peaks at 539.06 and 540.46 eV correspond to antimony (III) and antimony (V) oxides.
Figure 5B:
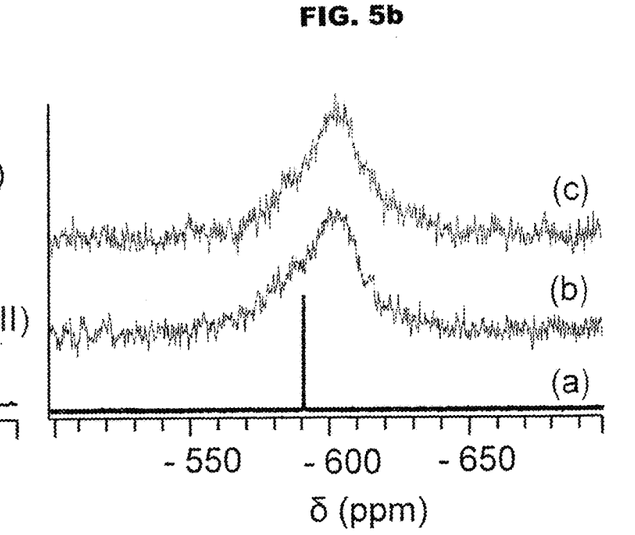
FIG. 5(b) presents a $^{119}$Sn NMR spectra of (a) hydroxostannate, (b) peroxystannate, and (c) peroxystannate and antimonate solutions in 15% $H_2O_2$.

XPS studies of the 800° C. treated ATO coated muscovite are illustrated in FIG. 5(a). The XPS studies reveal the Sn 3d 3/2 binding energy levels of Sn(IV) at 495.73 and Sn 3d 5/2 at 487.32 eV. The antimony 3d 3/2 peak can be deconvoluted to two peaks at 539.06 and 540.46 corresponding to Sb(III) and Sb(V) oxides, respectively. Deconvolution of the 3d 5/2 peak reveals two peaks at 529.72 and 531.12 matching the 3d 3/2 signals, in addition to an overlapping broad oxygen 1S signal. The ratio between the Sb 3d 3/2 and the 3d 5/2 signals was as expected 2:3. The molar Sn:Sb ratio by the XPS studies was 12:88. The ratio between the Sb(V) and Sb(III) by the XPS studies was 11:1.

The conductivity of the coated muscovite was measured to be 15 Ωcm.

Example 2—Comparative

Preparation of a Coated Solid Substrate from a Hydroxostannate and Hydroxoantimonate Solution (No Peroxide Added)

For the purpose of comparison, a muscovite substrate was ATO-coated by using a hydroxostannate and hydroxoantimonate precursor.

A precursor solution was first prepared by mixing 1.9 mL of the hydroxostannate solution of Preparation 1 and 5 mL of the hydroxoantimonate solution of Preparation 2.

600 mg of muscovite was dispersed in 15 mL of the precursor solution by sonication. Following 10 minutes of stirring, 120 mL of ethanol were added, however, no precipitation was observed.

Figure 3D:
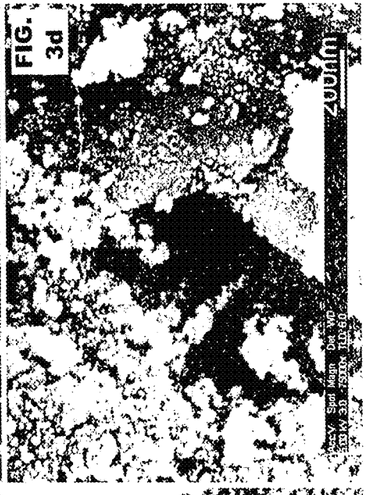
FIG. 3d is an SEM micrograph of ATO coated muscovite, prepared under identical condition as of FIG. 3b but without hydrogen peroxide.
Figure 4:
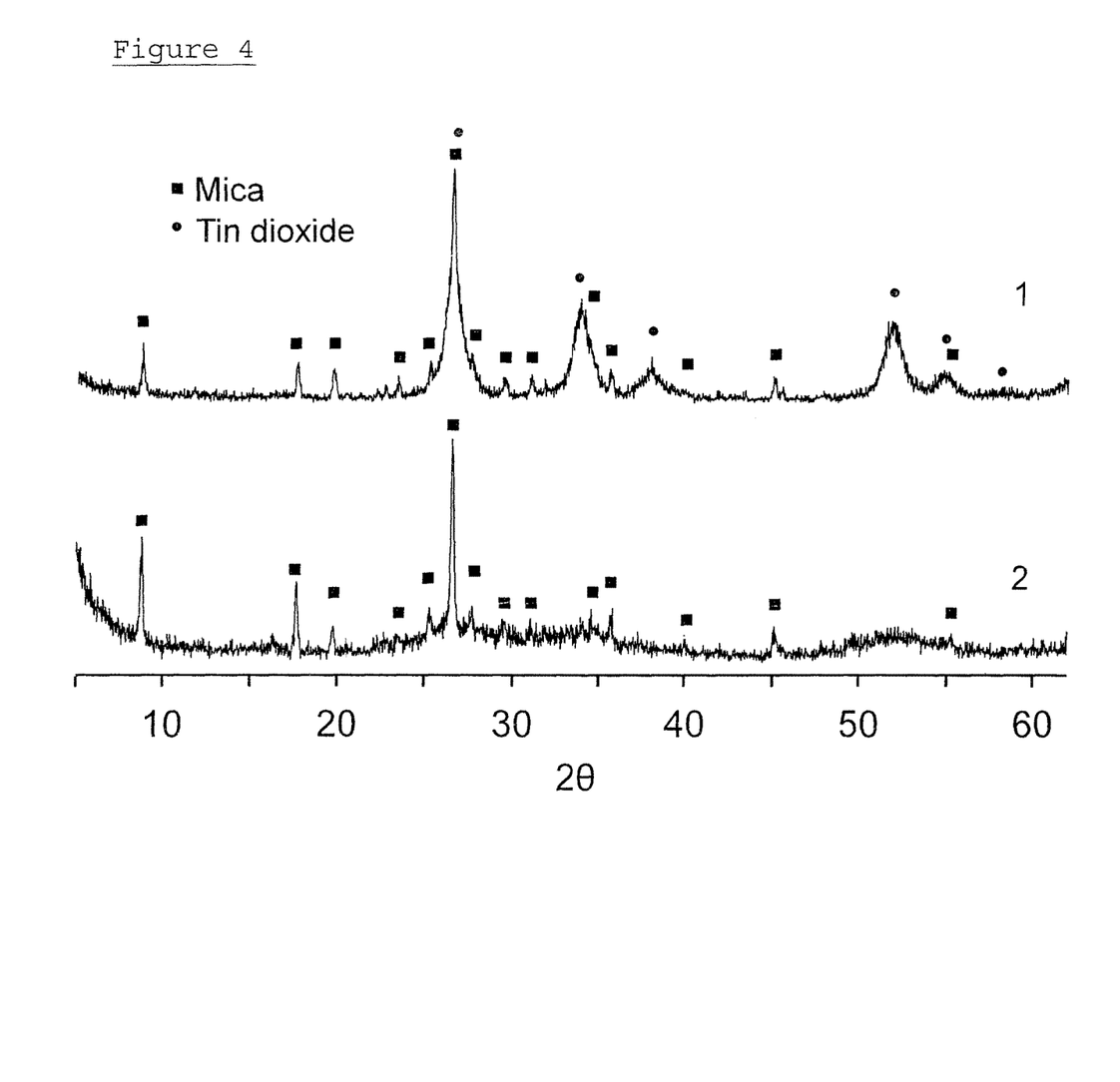

A mild and gradual acidification of the solution by the addition of 0.1M HCl down to pH 7 yielded only agglomerated material that did not coat the mica surface (FIG. 3d).

Example 3

Figure 8A:
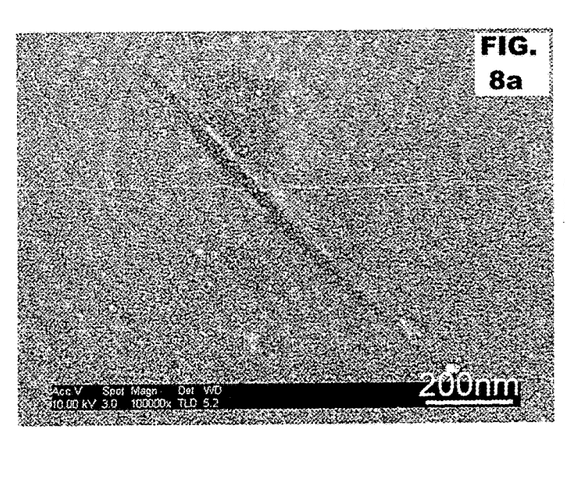
FIG. 8a is an SEM micrograph of antimony oxide coated mica.
Figure 8B:
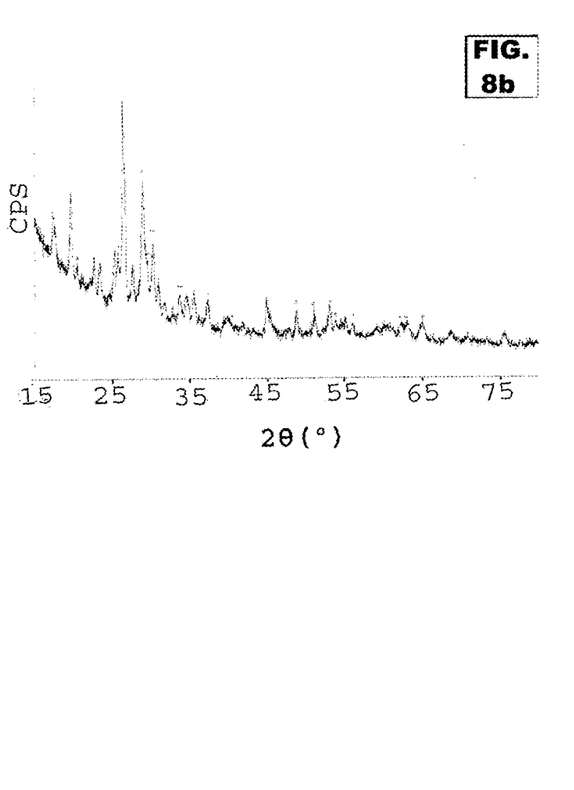
FIG. 8b illustrates XRD study of 800° C. calcined antimony oxide coated muscovite (asterisks denote $Sb_2O_4$ diffraction peaks).

Preparation of Antimony Oxide Coated Solid Substrates 0.2 g of Muscovite clay was dispersed by sonication in the precursor solution, containing 2 ml of tetramethylammonium hydroxoantimonate (see preparation 2) and 5 ml of hydrogen peroxide (60%). After additional 10 min of stirring, precipitation of particles on the clay surface was accomplished by the addition of 35 ml of ethanol. Coated clay was washed with ethanol, dried, and calcined at 500° C. for 6 h. The mineral was identified as $Sb_2O_4$ cervantite by powder x-ray diffraction. Crystallite size was estimated to be 5 nm by the x-ray diffraction (FIG. 8a provides the SEM micrograph and FIG. 8b illustrates the XRD diffractogram).

Example 4

Figure 9:
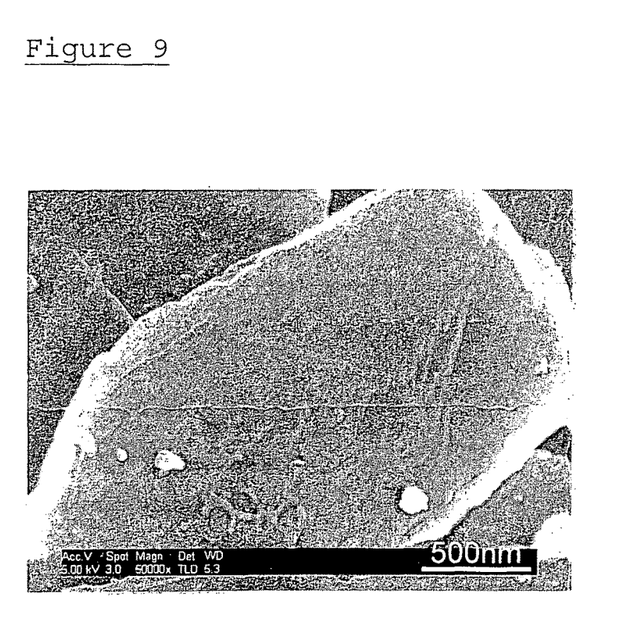
FIG. 9 is Muscovite coated by germanium oxide (after heat treatment at 500° C.)

Preparation of Germanium Oxide Coated Solid Substrates 0.2 g of muscovite clay was dispersed by sonication in the precursor solution, containing 3 ml of tetramethylammonium hydroxogermanate (see preparation 3) and 30 ml of hydrogen peroxide (30%). After additional 10 min of stirring, precipitation of particles onto the clay surface was accomplished by addition of 160 ml of mixture ethanol: diethyl ether (4:1). Coated clay was washed with ethanol, dried, and calcined at 500° C. for 6 h. A uniform coating of the mica was obtained as depicted in the micrograph of FIG. 9. The presence of germanium on the surface of the particles was confirmed by EDAX measurements showing 1.0 atom percent of Ge.

Example 5

Figure 10:
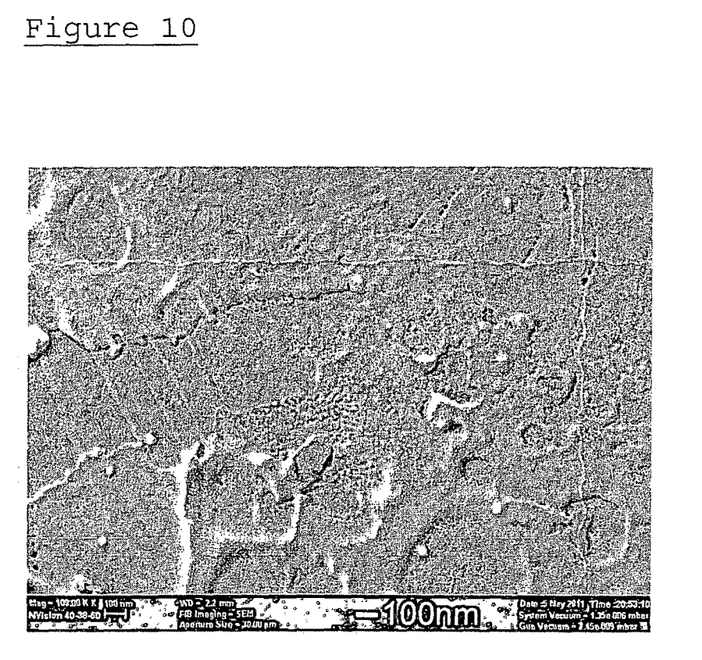
FIG. 10 is an SEM micrograph of tellurium oxide coated muscovite (after heat treatment at 400° C.).

Preparation of Tellurium Oxide Coated Solid Substrates 0.6 g of muscovite clay was dispersed in the precursor solution (Preparation 4) by sonication, and after an additional 10 min of stirring precipitation of peroxytellurate particles on clay surface was accomplished by addition 80 ml of mixture ethanol-diethyl ether (1:1). Resulting product was separated by centrifuge, washed 5 times by ethanol, dried in vacuum and calcined at 500° C. for 1 h. A non uniform coating of the mica was obtained as depicted in the micrograph of FIG. 10. The presence of tellurium on the surface of the particles was confirmed by EDAX measurements.

Example 6

Figure 6A:
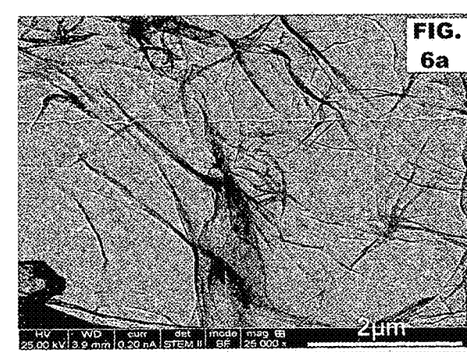
FIG. 6a is a STEM (scanning transmission electron microscopy) micrograph of graphene oxide.
Figure 6B:
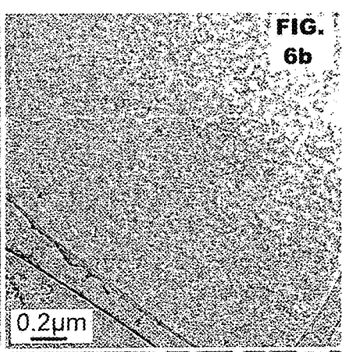
FIG. 6b is a TEM micrograph of graphene oxide coated by peroxytin nanoparticles (before heat treatment).

Preparation of Tin Peroxide and Tin Oxide Coated Graphene Oxide 50 mg of graphene oxide was redispersed by sonication in the precursor, consisting of 1 ml of 1.4 tetramethylammonium hydroxostannate solution (preparation 1) and 30 ml hydrogen peroxide (30%). 300 ml of mixture ethanol-diethyl ether (1:1) was added to the dispersion under vigorous stirring to achieve a coating of tin peroxyparticles on graphene surfaces. Then, coated material was filtered by means of centrifuge, washed with mixture of ethanol-diethyl ether (1:1) and dried in vacuum. Typical uniformly coated graphene oxide is shown in the STEM micrograph of FIG. 6b. Mean particle size was 5 nm.

Figure 7A:
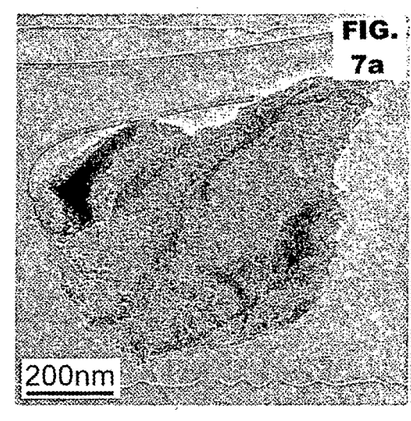
FIG. 7a is a TEM micrograph of graphene coated by peroxytin nanoparticles prepared by subjecting the materials of FIG. 6b to heat treatment at 800° C. in argon atmosphere.
Figure 7B:
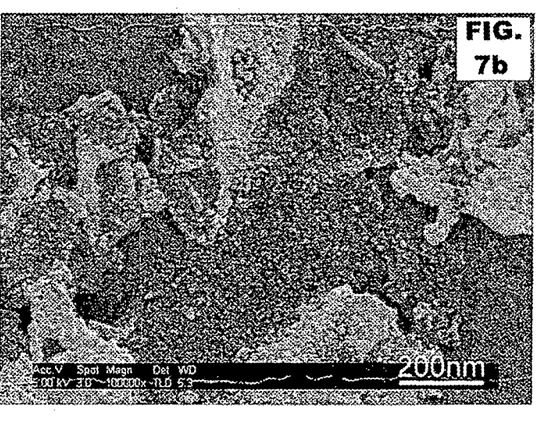
FIG. 7b is an SEM micrograph of tin oxide nanoparticle sheets prepared by subjecting the material of FIG. 6b to heat treatment at 800° C. in argon atmosphere.

Graphene oxide coated by tin peroxystannate was heated in an Ar atmosphere at 800° C. for 4.5 h to produce graphene coated by tin oxide. TEM and SEM micrographs (FIGS. 7a and 7b) show approximately 10 nm particles coating the thermally distorted graphene sheets.

Figure 6C:
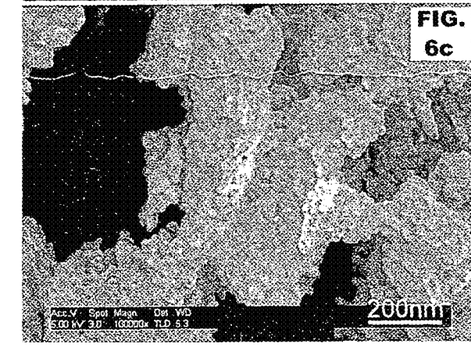
FIG. 6c is an SEM of tin oxide nanoparticle sheets prepared by subjecting the material of FIG. 6b to heat treatment at 800° C. in air.
Figure 6D:
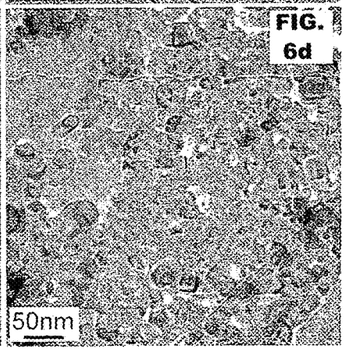
FIG. 6d is a TEM of tin oxide nanoparticle sheets prepared by subjecting the material of FIG. 6b to heat treatment at 800° C. in air.

Graphene oxide coated by tin peroxystannate was heated in air at 800° C. for 4.5 h to produce tin oxide sheets. FIG. 6c and FIG. 6d show the resulting sheets. It can be observed that the sheet is comprised of two layers of nanoparticles (that were formed by stacking of the two layers that covered the two sides of the graphene oxide). The average thickness of the sheets was approximately 35 nm.

The invention claimed is:
1. A process for forming a coating comprising metal oxide or mixed metal oxide nanoparticles of one or more metals selected from the group consisting of tin, antimony, germanium and tellurium on a solid substrate, comprising:

providing a basic metal-containing solution containing at least one metal selected from said group and hydrogen peroxide, and contacting said basic metal-containing solution with a solid substrate having oxygen-containing chemically reactive groups on its surface, wherein said solid substrate having oxygen-containing chemically reactive groups on its surface is contacted with said basic metal-containing solution and hydrogen peroxide solution under conditions allowing formation of peroxynanoparticle coating on the solid substrate upon addition of an antisolvent capable of inducing a precipitation of the peroxynanoparticle coating, wherein peroxynanoparticles present in the peroxynanoparticle coating have a diameter of less than 10 nm, with no agglomeration occurring in the basic metal-containing solution, as is evident by scanning electron microscopy or transmission electron microscopy; and heat treating the peroxynanoparticle coating to obtain a metal oxide or mixed metal oxide nanoparticle coating layer of less than 20 nm; wherein the heat treating comprises calcining the peroxynanoparticle coating on the solid substrate at a temperature of 300-1000° C.

2. The process according to claim 1, wherein at least one metal is present in the metal-containing solution in its highest oxidation state prior to addition of hydrogen peroxide to a metal-containing solution.

3. The process according to claim 1, wherein the basic metal-containing solution comprises tin in its highest oxidation state (+4).

4. The process according to claim 3, wherein the basic metal-containing solution further comprises antimony.

5. The process according to claim 1, wherein a base present in the basic metal-containing solution is a nitrogen-containing base.

6. The process according to claim 1, wherein the antisolvent is alcohol, acetonitrile, ethylacetate, ethers and mixtures thereof.

7. The process according to claim 1, wherein the oxygen-containing chemically reactive group present on the surface of the solid substrate is selected from the group consisting of —OH, —OOH, =O, M-O— wherein M indicates the solid substrate, carbonate and oxygenated SP2 carbon.

8. The process according to claim 1, wherein the step of contacting the basic metal-containing solution with the solid substrate is performed by dip coating, spread coating, spray coating or spin coating.

9. The process according to claim 1, wherein the solid substrate is selected from the group consisting of clays, sol-gel materials, and lithium niobate and calcite.

10. The process according to claim 1, wherein the concentration of hydrogen peroxide in the basic metal-containing solution is between 1% and 50% weight percent.

11. The process according to claim 1, wherein a pH of the basic metal-containing solution is higher than 9.

12. The process according to claim 1, further comprising removing the solid substrate by means of a heat treatment or dissolution step to obtain a structure consisting of sheets made of peroxynanoparticles or metal oxide nanoparticles that are essentially devoid of substrate material.

* * * * *